United States Patent Office 3,466,093
Patented Sept. 9, 1969

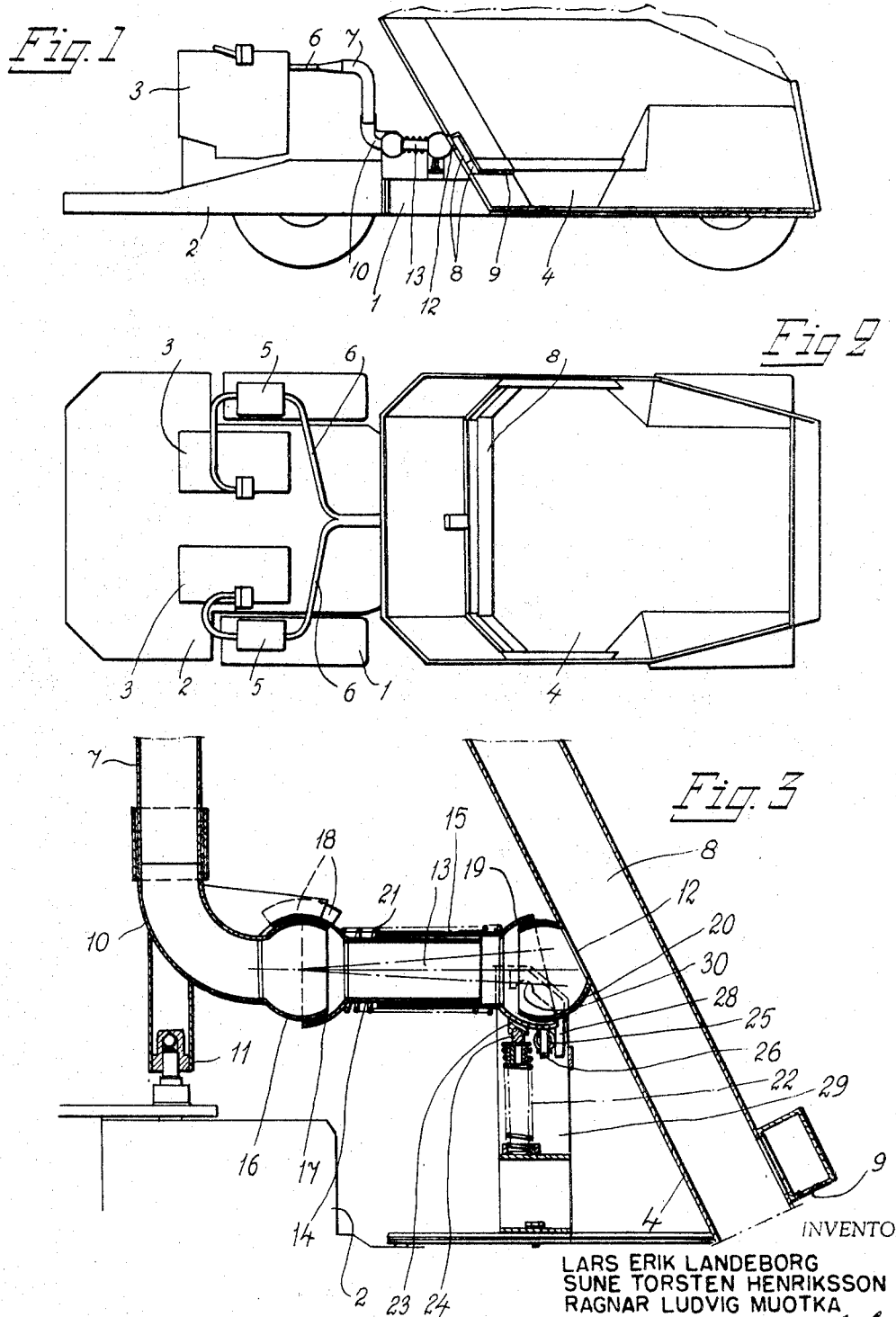

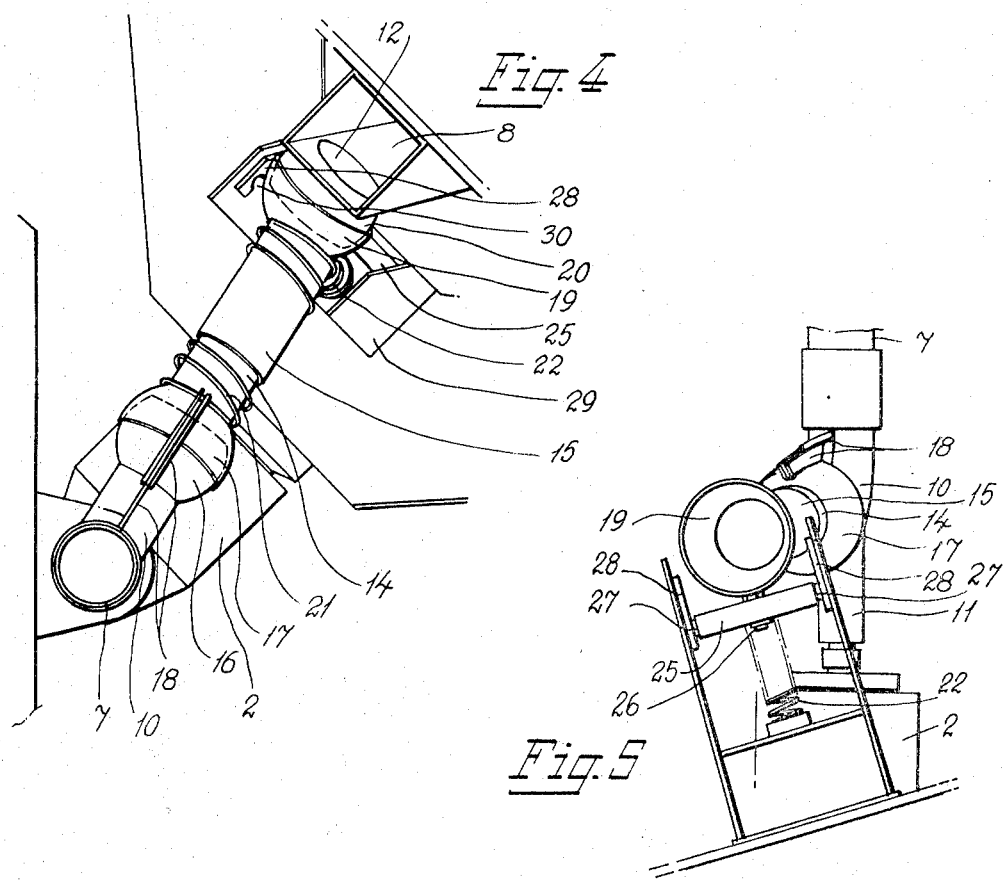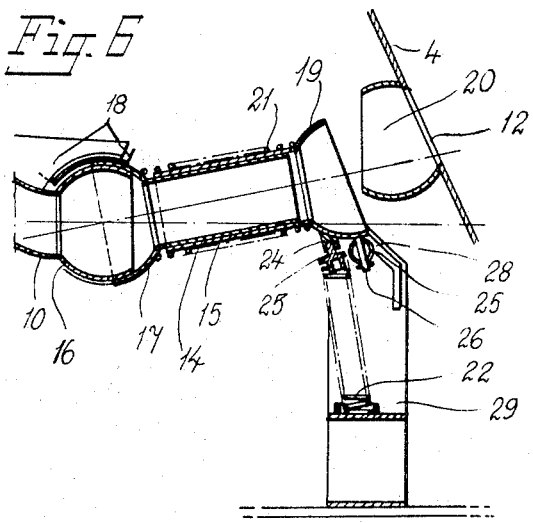

3,466,093
METHOD AND A DEVICE FOR PURIFYING THE EXHAUST GASES FROM MOTOR-DRIVEN MINING TRUCKS
Lars Erik Landeborg, Exercisgatan 2, Malmo, Sweden; and Sune Torsten Henriksson, Kvartsvagen 6; and Ragnar Ludvig Muotka, Kyrkogatan 46, both of Kiruna, Sweden
Filed May 18, 1967, Ser. No. 639,430
Claims priority, application Sweden, May 25, 1966, 7,142/66
Int. Cl. F02b 75/10; B60p 1/28
U.S. Cl. 298—1
10 Claims

ABSTRACT OF THE DISCLOSURE

A method of and structure for purifying exhaust gases from motor-driven trucks having a load container for carrying ore or similar material, particularly in spaces difficult to ventilate, such as mines or the like is disclosed. The method comprises feeding the exhaust gases into the load container from the engine so that the exhaust gases are forced to rise through the material carried in the container which material acts as a filter medium and cooling magazine, whereby steam is condensed and soot and oil particles are deposited on the material. The structure for accomplishing the method includes a load container having a duct adjacent the bottom thereof with a plurality of openings therein into which exhaust gases are passed and which pass therefrom into material in the load container and structure for connecting the exhaust gases between the engine and load container including a vertical rotatable coupling, an articulated telescoping pipe section having a spherical joint at both ends, one of which is restrained for upward swinging of the pipe section only, and the other of which is constructed to be automatically disengaged on pivoting of the load container.

---

As a step towards rendering mining operations more efficient it has been planned lately to carry out the transportation of ore and rock in mine galleries by means of motor-driven mining trucks instead of by railways. This entails the problem of how to get rid of the exhaust gases from the truck engines. In addition to the fact that the ventilation equipment required in mines has to be increased in scope and efficiency in order to provide the necessary circulation of air, purification of the exhaust gases prior to their being evacuated into the surrounding atmosphere in the galleries is desirable. The method and the device according to the invention serve the purpose of making such purification possible, without requiring the trucks to carry heavy extra equipment with a water magazine.

The chief characterizing feature of the method is that the exhaust gases from the truck engine or engines are conducted to one or more orifices opening at or near the bottom of theh load container of the trucks, which is essentially without other openings or orifices in the bottom and side walls, and are forced to rise through the ore carried in the container, the ore acting as a filter medium and cooling magazine producing, in combination, steam condensation and deposits of soot and oil particles on the ore.

The device according to the invention by means of which the method described above may be carried out is essentially characterized in that the exhaust outlet from the truck engine or engines is connected via an articulated pipeline, preferably comprising a section of adjustable length, to a duct system provided in the load container of the trucks and terminating in one or more orifices opening in the container at or near the bottom thereof and through which the exhaust gases may be evacuated in order to rise through the ore carried in the container.

Further objects and advantages of the invention will be described in the following with reference to the accompanying drawings showing a truck equipped with a device according to the invention.

FIGS. 1 and 2 are a vertical longitudinal section and a horizontal projection, respectively, of a truck in a slightly diagrammatic form.

FIG. 3 is a vertical section on a larger scale of parts of the truck showing the embodiment of the device according to the invention.

FIG. 4 is a horizontal section on line A—A in FIG. 3.

FIG. 5 is a vertical section on line B—B in FIG. 3.

FIG. 6 is a vertical section of part of a ball joint pertaining to the device in a separated state.

The truck shown in FIGS. 1 and 2 consists of a motor vehicle 1 on the chassis 2 of which there are provided two engines 3 beside each other and behind these a load container 4 which can be tilted backward. Each engine 3 has its own catalyst filter 5, and the exhaust ducts 6 from the two filters are united so as to form a common exhaust pipe 7 located in the vertical central plane of the truck. Contrary to what is otherwise usual in motor vehicles, this exhaust pipe 7 does not open into the surrounding atmosphere but is connected via a pipeline described in the following to a duct system 8 provided in the load container 4 and extending down to the vicinity of the bottom of the load container along its rear wall and further along the side walls, and having orifices 9 through which the exhaust gases may be evacuated into the load container essentially below the point of gravity of the ore.

While the exhaust gases rise through it, the ore acts as a filter medium separating soot and oil particles from the exhaust gases and further as a cooling magazine producing condensation of the steam components in the exhaust gases. However, this purification of the exhaust gases will only take place while the ore trucks carry filled load containers from the place of loading to the place of dumping. During the return journey, which is often made downhill, the device is inoperable, but on the other hand the engines do not develop even approximately the same power during this journey and will consequently not give off the same volume of exhaust gases. Since ore carried by the trucks is currently renewed, there is no problem about regenerating it.

The pipeline by means of which the exhaust pipe 7 is connected with the duct system 8 is of such a construction that during operation it will permit any changes in the relative positions of the engine portion and the load container portion of the ore truck. Such changes are caused inter alia by horizontal swinging and pivoting of these parts of the truck in relation to each other. The pipeline is further of such a kind it can be taken apart and put together again automatically when the load container is tilted forward and backward at the dumping of the goods. As is best shown in FIG. 3, the pipeline comprises a curved pipe section 10, at one end of which the vertically downwardly-directed outlet end of the exhaust pipe 7 is inserted and pivotable with a good fit in order to form a vertical rotatable coupling. The curved pipe section is supported on the chassis 2 by means of a pivot 11. Between the other end of the curved pipe section 10 and the inlet opening 12 to the duct system 8 provided in the wall of the load container 4 there is connected an articulated pipeline section 13 of adjustable length, which consists of two straight pipe sections 14 and 15 telescopically inserted into each other. One 14 of these pipe sections is connected to the curved section 10 by means of a spherical joint consisting of two co-operating spherical bowls 16 and 17 on the two opposite ends of the curved pipe section 10 and the straight pipe section 14, respectively, and also comprises an arcuate guide 18 restricting the mobility of the joint to the vertical plane. The other pipe section 15 is connected to the inlet opening 12 by means of a second spherical joint consisting of two co-operating spherical bowls 19 and 20, one 19 of which is provided on the end of the pipe section 15, while the other 20 is immovably united with the wall of the load container 4 around the opening 12. A compression spring 21 surrounding the telescopical pipe sections 14 and 15 keeps the joint bowls of the two spherical joints sealingly pressed together when the load container occupies the normal transport position. The spherical bowl 19 is supported on the rear part of the chassis 2 carrying the load container by a spring device 22 having a supporting pin 23 at the top, said pin co-operating with a seat 24 disposed on the underside of the bowl 19, the spring means 22 being compressed when the load container is in the transport position shown in FIG. 3.

When tilting the load container 4 the inner spherical bowl 20 may become separated from the outer bowl 19 (FIG. 6) while the pipeline section 13 is swung upward in the joint 16, 17, the spring means 22 following. The pipeline section 13 has a device for positive retention thereof in the position where the inner bowl 20 leaves the outer one. This device consists of a transverse yoke 25, which is supported by a downwardly-directed pin 26 fixed to the underside of the bowl 19 and the ends of which are provided with rollers 27, and of two guide rails 28 disposed opposite each other, each on one side of the pipeline section 13 in a frame 29 fixed on the load container portion of the chassis 2 and with which the rollers 27 are meant to co-operate. The guide rails 28 have guide surfaces which are disposed obliquely in such a way that when the yoke 25 moves upward they will force the said yoke and consequently the spherical bowl 19 and the pipe section 15 to become displaced backward with additional compression of the spring 21. At the top end of the guide surfaces each of the guide rails 28 has a cylindrical recess 30 for receiving the respective roller 27 when the pipeline section 13 has reached its final position. It is retained in this position by the spring means 22, and when the load container 4 returns to the transport position after a tilting movement, the bowl 19 is therefore in the correct position for receiving the bowl 20 again, as shown in FIG. 6.

We claim:

1. A method of purifying exhaust gases from a motor-driven mining truck having a load container including means for dumping a load for carrying ore or the like, comprising passing the exhaust gases from the engine into the load container through at least one opening adjacent the bottom of the load container and into material therein when the load container is filled whereby the exhaust gases pass upwardly through the material in the load container to be cooled and filtered thereby.

2. The method as set forth in claim 1, wherein the load container includes a duct adjacent the bottom thereof having a plurality of openings therein exposed to material in the load container and wherein the exhaust gases are passed into the duct and out of the plurality of openings therein into material in the load container for cooling and filtering thereof.

3. The method as set forth in claim 1 and further including passing the exhaust gases through a readily disconnectable articulated pipe section between the engine and load container.

4. Structure for purifying exhaust gases from motor-driven mining trucks, including a combustion engine and a load container including means for dumping a load comprising an opening through the bottom of the load container, and means connected between the engine exhaust and the opening through the bottom of the load container for passing exhaust gases from the engine directly into a load in the load container through the opening, whereby when the load container is filled the exhaust gases are cooled and filtered as they pass upward through material in the load container.

5. Structure as set forth in claim 4 and further including a duct within the load container having a plurality of openings therein in communication with the opening through the load container, whereby the exhaust gases from the engine are first passed into the duct and are subsequently passed into the load for cooling and filtering.

6. Structure as set forth in claim 4 and further including an articulated pipe section between the engine and load container for permitting relative movement between the engine and load container through which the exhaust gases are passed between the engine and load container.

7. Structure as set forth in claim 6 wherein the articulated pipe section includes telescoping parts, a spherical joint at each end and resilient means for urging the telescoping parts toward the spherical joints to seal the spherical joints.

8. Structure as set forth in claim 7 and further including a guide in conjunction with one of the spherical joints for restricting movement of the articulated pipe section to vertical movement about a horizontal pivot axis.

9. Structure as set forth in claim 7 and further including means for disconnecting the other spherical joint on pivotal movement of the load container in one direction and for reengaging the other spherical joint on pivotal movement of the load container in the other direction.

10. Structure as set forth in claim 6 and further including a vertical rotatable coupling positioned between the engine exhaust and the one spherical joint for permitting rotation of the articulated pipe line about a vertically extending axis.

References Cited

UNITED STATES PATENTS

| 464,086 | 12/1891 | Souder | 105—451 |
| 2,789,032 | 4/1957 | Bagley. | |
| 3,039,493 | 6/1962 | Licari. | |
| 3,134,628 | 5/1964 | Lackey | 105—451 X |

FOREIGN PATENTS

| 224,735 | 4/1958 | Australia. |
| 778,255 | 7/1957 | Great Britain. |

RICHARD J. JOHNSON, Primary Examiner

U.S. Cl. X.R.

60—29